Figure 3A:
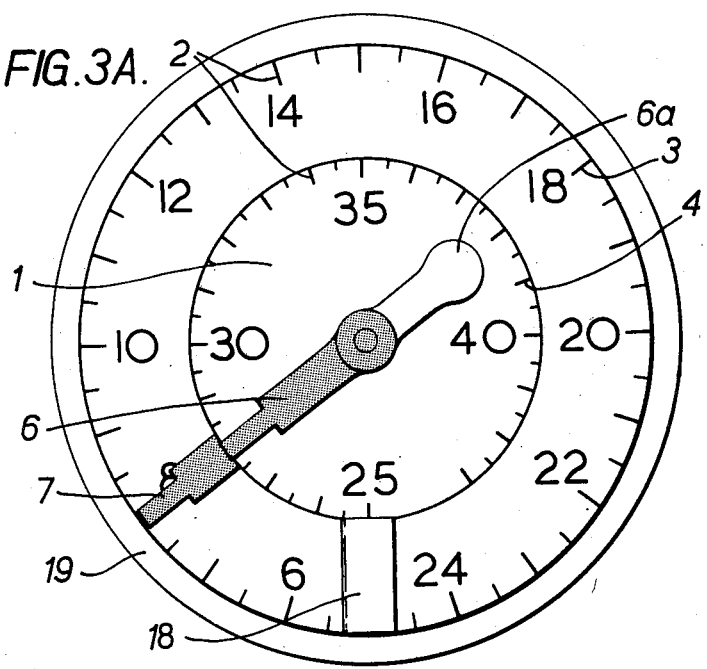

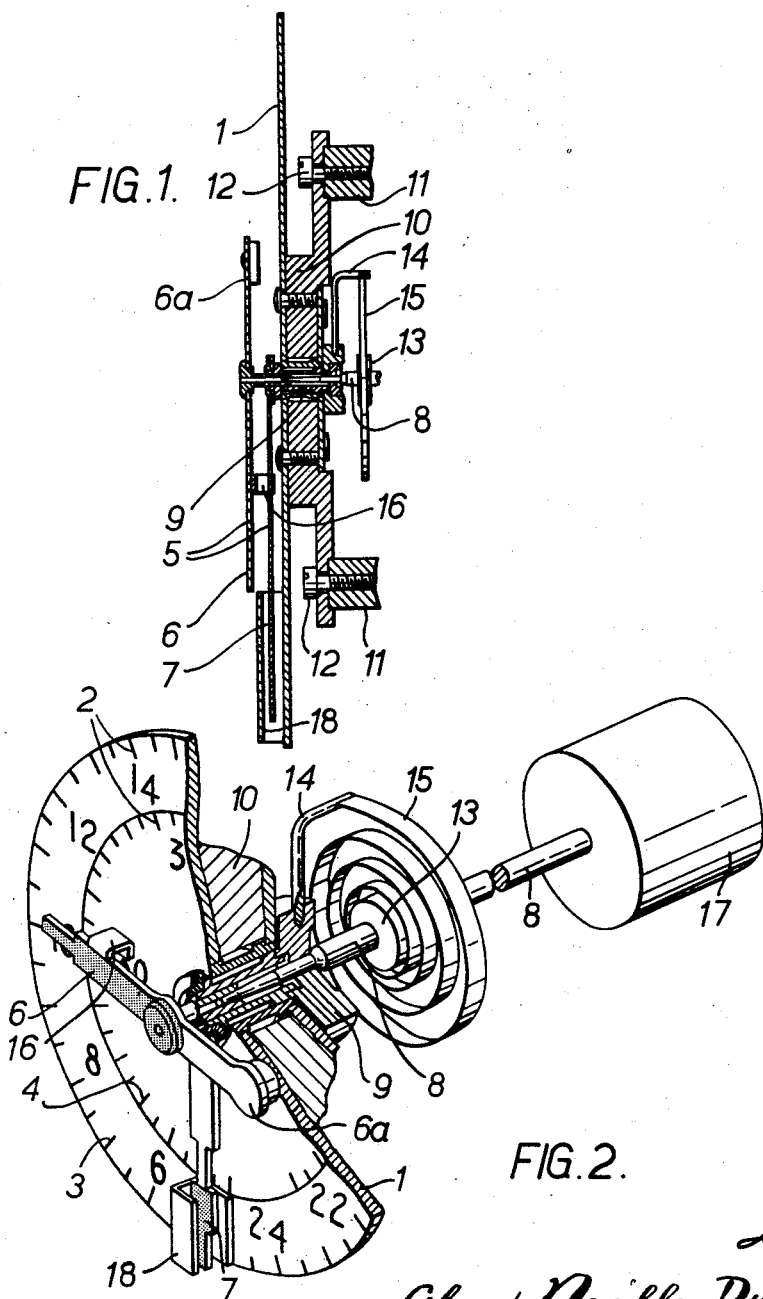

March 31, 1964  A. N. DU FEU  3,126,863

INDICATING INSTRUMENTS

Filed Feb. 2, 1962  3 Sheets-Sheet 2

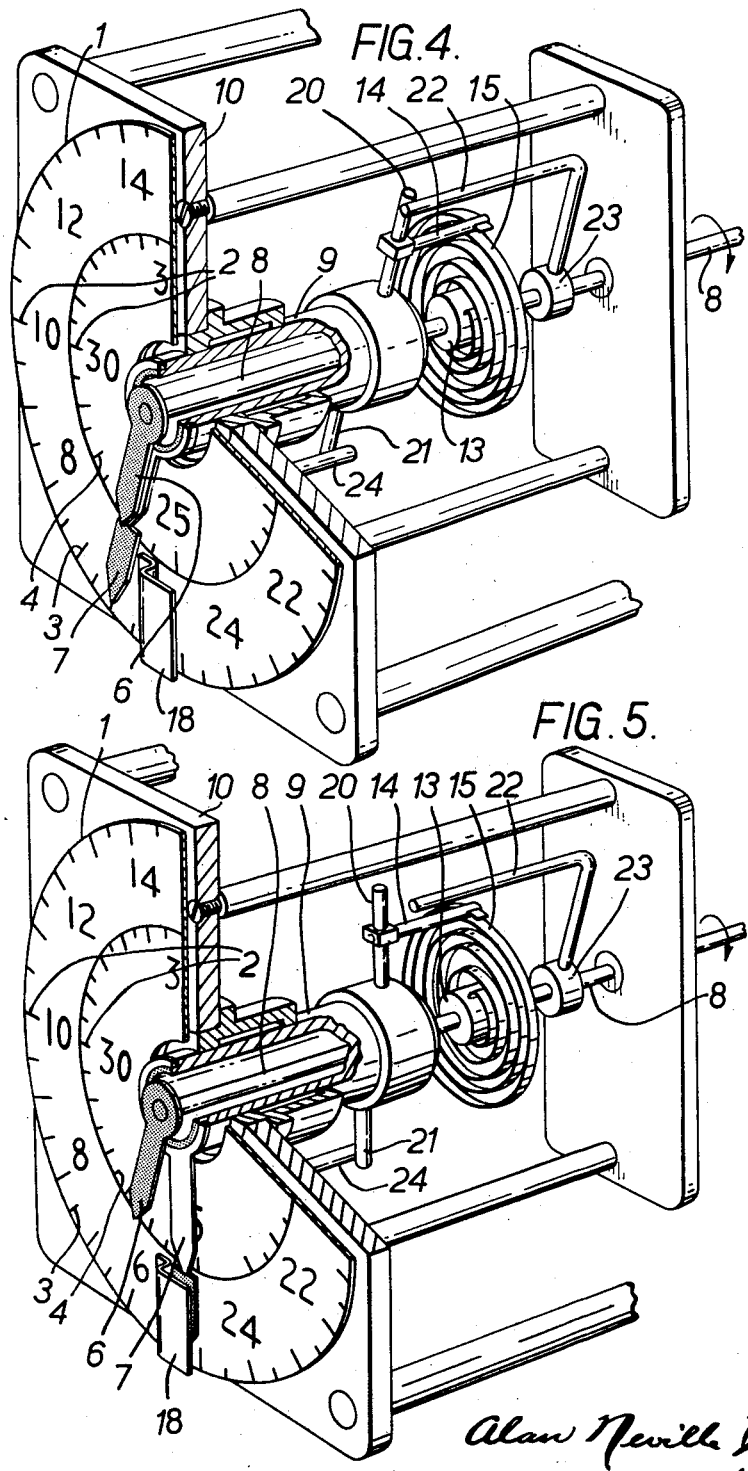

United States Patent Office 3,126,863
Patented Mar. 31, 1964

3,126,863
INDICATING INSTRUMENTS
Alan Neville Du Feu, Cheltenham, England, assignor to S. Smith & Sons (England) Limited, London, England, a British company
Filed Feb. 2, 1962, Ser. No. 170,616
Claims priority, application Great Britain Feb. 3, 1961
7 Claims. (Cl. 116—129)

The present invention relates to indicating instruments of the kind (hereinafter referred to as instruments of the kind specified) having a pointer and a scale which is marked or carried on the face of the instrument, the pointer and scale being rotatable relative to one another about a common axis normally to the plane of the instrument face in dependence upon the magnitude of a variable quantity to be indicated so that the pointer can indicate that magnitude on the scale, but the full range of variation of the quantity necessitating more than one complete revolution of the pointer and scale relative to one another as the quantity varies from the lowest to the highest values to be indicated.

In the past with such instruments it has been customary to provide two or more pointers, more or less after the fashion of the hands of a clock, the pointers being geared together in such a manner that one rotation of a first pointer corresponds to only a fraction of a rotation of one or more other pointers. Alternatively, a single pointer has been provided which registers simultaneously with two or more concentric scales, the operator having to make the decision which of the readings is the correct one.

Multi-pointer and multi-scale instruments of these known kinds are acceptable where the indication can be read more or less at leisure and/or a misreading of the instrument will not involve dangerous or catastrophic results. However, difficulty has arisen in connection with instruments to which these conditions may not always apply, for example altimeters and airspeed indicators for aircraft, where a misreading has on occasion in the past led to a dangerous situation.

One form of instrument in which this difficulty is overcome is described in U.S. Patent No. 3,057,322. However, as mentioned in that specification the invention is not entirely suitable for application to instruments in which the torque available for deflecting the pointer relative to the scale is comparatively small, such for example as instruments having electro-magnetic movements of the moving coil type or mechanical movements driven from a source of limited power (e.g., an aircraft airspeed indicator driven from a pressure capsule).

According to the present invention, therefore, we provide an instrument of the kind specified comprising a scale extending through an angle between 360° and 720°, the scale being divided into outer and inner parts which are of different radii and are arranged so that the part from which readings should be taken, changes as the quantity to be indicated passes through an intermediate value, a pointer which is in two parts, one of which is long enough only to register with the inner part of the scale but not the outer part and the other of which is long enough to register with the outer part of the scale, spring means acting in the absence of any other constraint to hold the two parts of the pointer together, a stop positioned in the instrument to prevent rotation of the longer part of the pointer (but not the shorter part) in one direction from that orientation, or one close thereto, at which the pointer registers with the marking corresponding to said intermediate value and means for obscuring at least the outer end of the longer part of the pointer when in the position in which its rotation in one direction is prevented by the stop.

Preferably, at least that part of the face of the instrument which lies within the scale parts, is of one colour only, the shorter part of the pointer being of a contrasting colour and the longer part of the pointer being of the same colour as the face except for its outer end which, from a point lying outside the inner part of the scale, is of a contrasting colour. In particular, the length of the shorter part of the pointer will usually be equal to or slightly less than the radius of the inner part of the scale whilst the length of the longer part of the pointer is equal to or slightly less than the radius of the outer part of the scale, the longer part of the pointer being of a contrasting colour to the face of the instrument for that part which extends from the inner part of the scale to the outer part. In some cases, both parts of the pointer may be of the same colour as the face of the instrument and may have areas of contrasting colour painted on them. In any case, the areas of contrasting colour may be painted with luminescent paint so as to be visible in the dark. The contrasting colours will commonly be black and either white or some other light colour.

Said means for obscuring the outer end of the longer part of the pointer may consist simply of a screen of the same colour as the instrument face and lying in front of it so that the outer end of the longer part of the pointer passes behind it when the pointer reaches the position in which the outer end is to be obscured.

The outer part of the scale will usually extend through an arc subtending an angle rather less than 360°, for example 350°, so as to leave a space for the obscuring means. The inner part of the scale may, if required, extend through a complete circle.

The stop may engage the longer part of the pointer itself and may then additionally be integral with the obscuring means. In some cases, however, for example in precision instruments, it is preferred that the stop should engage some member which is integral with but more robust than the longer part of the pointer so as to avoid the possibility of bending or otherwise damaging it.

The mechanism provided for driving the pointer may be an electro-magnetic movement such as a moving coil or moving iron movement or it may be some form of small electric motor such as a synchro. In other cases, the mechanism may be purely mechanical, the pointer being driven through a gear train in response to the movements of some mechanical sensing device such as a pressure sensing capsule. It will be appreciated that whilst reference is made here to driving the pointer relative to the scale, it is possible, although perhaps unusual, to drive the scale relative to the pointer.

Two arrangements are possible in instruments according to the present invention. In the first, the outer part of the scale runs from the lowest value to be indicated up to, or just beyond, the intermediate value whilst the inner part runs from the intermediate value up to the highest value to be indicated. The stop is positioned so that the longer part of the pointer is free to rotate from the position corresponding to the lowest value up to or just beyond, the position corresponding to the intermediate value. Thus, in operation, if the pointer is driven continuously from the position corresponding to the lowest value up to that corresponding to the highest value, the two parts of the pointer can rotate together from the lowest value position up to the intermediate value position. Here, the stop prevents further rotation of the longer part of the pointer and the shorter part only can continue to rotate, the spring means acting simply to exert an additional restoring force against the further motion of the shorter part.

In the second, the inner part of the scale runs from the lowest value to be indicated up to, or just beyond, the intermediate value whilst the outer part runs from the intermediate value up to the highest value to be indicated. The stop is positioned so that the longer part of the pointer is free to rotate from the position corresponding to the highest value down to, or just beyond, the position corresponding to the intermediate value. Thus, in operation, when the quantity to be indicated is at the lowest value, the two parts of the pointer will be separated, the shorter part registering with the lowest value on the inner part of the scale and the longer part being held in the position corresponding to the intermediate value and being obscured from view. If now the quantity increases continuously from the lowest value, the shorter part of the pointer will rotate alone until it reaches the intermediate value and the two parts of the pointer will then rotate together from the intermediate value up to the position corresponding to the highest value.

Figure 3B:
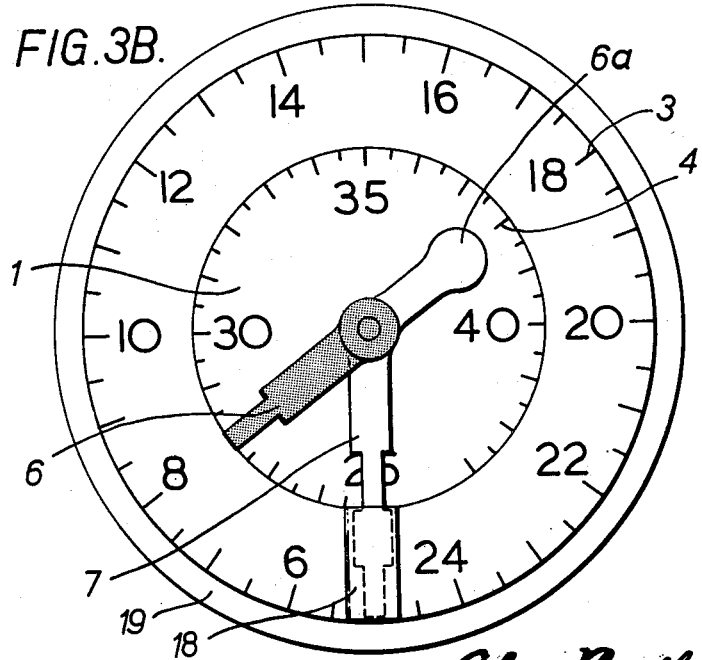

Two indicating instruments according to the present invention will now be described by way of example with reference to the accompanying drawings in which:

FIGURE 1 shows a section through the relevant parts of the first instrument in a plane containing the axis of rotation, FIGURE 2 shows a perspective view (partly cut away) of the same parts of the first instrument, FIGURES 3A and 3B show two front views of the face of the first instrument with the pointer indicating different magnitudes, and FIGURES 4 and 5 show perspective views (partly cut away) of parts of the second instrument, the pointer indicating different magnitudes in the two figures.

Referring first to FIGURES 1 and 2, the first instrument has a dial 1 in the form of a circular disc. On the side of this which is exposed to view, there is painted a scale 2 having an outer part 3 and an inner part 4 (these are shown only in FIGURE 2 or more clearly in FIGURES 3A and 3B which will be referred to in detail below). Each of the scale parts 3 and 4 is in the form of a circular arc centred on the centre of the dial 1. Whilst reference is made her to the scale 2 being painted on the dial 1, it will be understood that it may be marked or mounted on the dial 1 in any other manner according to requirements. In addition, although the dial 1 is a circular disc in this instance it may, of course, be of some other shape, for example square, although the scale parts 3 and 4 must of necessity be circular.

As shown in FIGURE 1, the dial 1 is secured to a member 10 which is itself secured to pillars 11 by means of screws 12. The pillars being secured in known manner to the main framework (not shown) of the instrument which will also be arranged so that it can be mounted within a conventional instrument case (not shown) having a circular, glass-covered viewing aperture through which the dial 1 can be seen.

The instrument is intended for use as an airspeed indicator in an aircraft. As shown in FIGURES 2 and 3, the scale 2 is provided with divisions each representing 5 knots indicated air speed whilst the total range of air speed which can be indicated, is from 60 up to 430 knots. The outer scale part 3 extends from 60 up to 250 knots, figures indicating the air speed in tens of knots being provided against the appropriate scale divisions every 20 knots. The inner scale part 4 extends from 250 up to 430 knots, the divisions again representing 5 knots and figures being provided against the appropriate scale divisions at every 50 knots. An air speed of 250 knots is in this instance the intermediate value referred to above at which, as the magnitude of the air speed to be indicated varies, the part of the scale from which readings have to be taken changes from the outer one to the inner one, or vice versa, the divisions representing 250 knots on the two scale parts 3 and 4 lying on the same radius of the dial 1.

The instrument has a pointer assembly 5 which has two pointers, a shorter pointer 6 and a longer pointer 7, the shorter pointer 6 being provided with a balance arm 6a which will not be referred to further in this description. The shorter pointer 6 is a press fit on to the end of a shaft 8 which is free to rotate about its longitudinal axis which passes through the centre of the dial 1 normal to the plane thereof. The longer pointer 7 is mounted on the end of a shaft 9 which surrounds the shaft 8 and is coaxial therewith. The shaft 8 is carried in journal bearings provided on the shaft 9 which is itself carried in journal bearings provided on the member 10 which carries the dial 1.

The shaft 8 carries a collet 13 and the shaft 9 a spring post 14 to which are attached the two ends of a coiled spring 15. The spring is arranged (see FIGURE 2) to exert a clockwise torque on the shaft 9 (as it appears in FIGURE 2) so that in the absence of any other constraint the longer pointer 7 is normally maintained in coincidence with the shorter pointer 6, a bracket 16 being provided on the pointer 6 to receive and locate the pointer 7 when the two pointers 6 and 7 are in coincidence. As will be apparent from FIGURE 1, the pointers 6 and 7 are positioned axially so that the pointer 7 lies between the pointer 6 and the face 1 when this occurs.

The shaft 8 is caused to rotate in operation in accordance with the magnitude of the air speed of the aircraft in which the instrument is mounted, some suitable form of mechanism for driving the shaft being provided. This mechanism may for example be a mechanical drive from pressure capsules mounted within the instrument casing or may be some form of electrical or electromagnetic driving mechanism such as a moving coil movement or a small electric motor, for example, a synchro. The form of driving mechanism is immaterial to the present invention and it will not therefore be described. By way of illustration, a small moving coil movement 17 is indicated diagrammatically in FIGURE 2.

Mounted at the periphery of the dial 1 in the space between the two ends of the outer scale part 3 is a mask-cum-stop member 18 which is positioned so as to lie in the path of the outer end of the longer pointer 7. As will be apparent from FIGURE 1, the shorter pointer 6 clears the member 18 whenever it rotates past it but the longer pointer 7 is prevented by it from rotating in the clockwise direction past the intermediate value of 250 knots. At the same time, the member 18 obscures the outer end of the pointer 7 from the view of an observer looking at the instrument in the normal manner.

Reference will now also be made to FIGURES 3A and 3B which show the instrument face 1 as it normally appears through the viewing aperture of an instrument case 19. As shown, the dial 1 is painted white apart from the scale markings which are black whilst the operative part of the pointer 6 is black as is the outer end of the pointer 7, the other parts of both pointers 6 and 7 being painted white. (The parts which are painted black are shown cross-hatched in the drawings.) The outer end of the shorter pointer 6 is narrower than the remainder and its overall length is equal to the radius of the inner scale part 4 so that, see FIGURE 3B especially, its tip registers with that scale part. The inner end of the longer pointer 7 is the same shape as the shorter pointer 6 and the outer end which extends from the inner scale part 4 to the outer part 3 has a narrow end the tip of which registers with the outer scale part 3.

The instrument is assembled so that, for an air speed of 60 knots or less, the two pointers 6 and 7 are in coincidence and are aligned with the scale marking at the lowest end of the outer scale part 3. Assuming the air speed then to increase steadily from the lowest to the highest possible value, the two pointers 6 and 7 will rotate together in a clockwise direction from this starting position and will appear as shown in FIGURE 3A of the accompanying drawings the black outer end of the longer pointer 7 appearing to be continuous with the black shorter pointer 6 and registering quite clearly with the outer scale part 3. When the air speed reaches the intermediate value of 250 knots, the black outer end of the longer pointer 7 will engage the member 18 and its outer end will be obscured by it. The shorter pointer 6 is however free to continue rotation separately against the torque exerted by the spring 15, its tip registering with the inner scale part 4 as shown in FIGURE 3B for an air speed value rather higher than the intermediate values. Although it is not entirely apparent from FIGURE 3B, the inner end of the longer pointer 7 which is not obscured by the member 18 is for all intents and purposes invisible if it is painted the same colour as the background of dial 1 (the necessity to show the outline of this part in FIGURE 3B makes this less apparent than is the case in practice).

In this manner, an instrument is provided which has a scale 2 extending through an angle of approximately 700° but in which there is no difficulty in distinguishing which part 3 or 4 of the scale should be read, even if the instrument is looked at only briefly.

FIGURES 4 and 5 show perspective views of a second instrument, the views being identical except for the pointer positions which are such that the shorter pointer part 6 is in the same position (the same references are used where appropriate as in FIGURES 1–3) in both figures but that the longer pointer part 7 is in coincidence with the shorter part 6 in FIGURE 4 but retained at the intermediate position in FIGURE 5.

The construction and operation of the second instrument is basically the same as that of the first, the only essential difference being that the outer end of the longer pointer part 7 is only obscured by the member 18 and does not come into engagement with it, a stop mechanism being provided internally to prevent rotation of the part 7 beyond the intermediate value.

For this purpose, the shaft 9 carries two radial pins 20 and 21 lying diametrically opposite one another, the pin 20 carrying the spring post 14 whilst the shaft 8 carries a right angled pin 22 which projects from a boss 23 secured to the shaft 8. The outer end of the pin 21 extends axially parallel to the shaft so that it can be engaged by the pin 20. In addition the member 10 carries a fixed pin 24 lying parallel to the shafts 8 and 9 but spaced from them.

In FIGURE 4, where the two pointers 6 and 7 are in coincidence, the pins 20 and 22 are in engagement and are maintained in engagement by the spring 15. The shafts 8 and 9 are free to rotate clockwise together with the pointers 6 and 7 in coincidence until the pin 21 on shaft 9 comes into engagement with the fixed pin 24. This occurs when the intermediate value 250 knots is reached and the outer end of pointer 7 is obscured behind the member 18 although not in engagement therewith.

FIGURE 5 shows the condition when the reading has exceeded the intermediate value by a small amount. The pins 21 and 24 are still in engagement, pointer 6 has rotated past the intermediate value and is registering with the inner scale part 4, pointer 7 has stayed at the position for the intermediate value and its outer end is obscured, whilst pins 20 and 22 have separated, the spring 15 exerting a slight additional torque against the motion of the pointer 6.

This arrangement obviates the possibility of damage to the pointer 7 by contact with the member 18.

Whilst two instruments according to the invention have been described above with reference to the drawings, it will be appreciated that these are only examples of many others. In particular, the quantity to be indicated and the values which can be indicated may be varied at will. Also linear or non-linear scales may be employed.

Further, the two scale parts 3 and 4 may be re-arranged depending on the requirements of a particular instrument, for example by varying the lengths of the arcs which they occupy, their radii or the direction in which the scale increases (and corresponding the direction of rotation of the pointer). In addition, the inner and outer scale parts may be transposed so that the inner one is the lower end of the scale and the outer the higher one. In this last case, some slight re-arrangement is required. The longer pointer 7 will be prevented by the stop from rotating below the intermediate value. Thus, when it is required to indicate the lowest value, the shorter pointer 6 will register with the inner part of the scale and will be separated from the longer pointer 7 which will be held, substantially invisible, at the intermediate value. If the magnitude of the quantity now increases, the shorter pointer 6 will rotate around the inner scale part up to the intermediate value, above which the two pointers will rotate together, the longer pointer 7 registering with the outer scale part.

In all cases, the outer part of the scale will be limited to an arc slightly less than 360° in order to leave room for the mask 18 or similar obscuring means which must be provided to obscure the outer end of the longer pointer. The inner scale part may however extend through any desired arc up to a full circle.

Whilst the instruments have been shown having dark scales marked on a light background, together with a dark shorter pointer and a dark outer end to the longer pointer, the converse may also be used, particularly where the scale and the pointer assembly 5 are required to be made visible in the dark by the use of luminescent paint.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. An indicating instrument, comprising a pointer assembly, a dial, means mounting the pointer assembly and the dial for relative rotation about a common axis normal to the plane of the dial, a scale on the dial circumscribing said common axis, and a driving mechanism for imparting relative rotation to the pointer assembly and the scale in dependence upon the magnitude of a variable quantity to be indicated, the said scale being divided into inner and outer parts of different radii, the inner scale part running from a first scale value to an intermediate scale value and the outer scale part from the intermediate scale value to the said second scale value, said pointer assembly having first and second pointers mounted for separate rotation about said axis, the length of the first and second pointers being substantially equal respectively to the radii of the inner and outer parts of the scale, spring means acting to hold the two pointers together, a stop positioned to prevent rotation of the second pointer through the intermediate scale value whilst permitting the first pointer so to do and screening means for obscuring at least the outer end of the second pointer when at the intermediate scale value.

2. An indicating instrument according to claim 1 in which at least that part of the face of the instrument which lies within the outer part of the scale, is of one colour only, the first pointer being of a contrasting colour and the second pointer being of the same colour as the face except for its outer end which, from a point lying outside the inner part of the scale, is of a contrasting colour.

3. An indicating instrument according to claim 1 in which said screening means comprises a screen of the same colour as the instrument face and lying in front of it so that the outer end of the second pointer lies behind it when the second pointer is at the intermediate scale value.

4. An indicating instrument according to claim 1 in which the outer part of the scale extends through an arc subtending an angle not greater than 355°.

5. An indicating instrument according to claim 1 in which the inner part of the scale extends through a complete circle.

6. An indicating instrument according to claim 1 in which the stop engages the second pointer itself and is integral with the screening means.

7. An indicating instrument according to claim 1 which further includes a member mounted integrally with the second pointer for rotation therewith and the stop engages the said member.

References Cited in the file of this patent

UNITED STATES PATENTS

| | | |
|---|---|---|
| 290,116 | Russell | Dec. 11, 1883 |
| 3,057,322 | Majendie | Oct. 9, 1962 |

FOREIGN PATENTS

| | | |
|---|---|---|
| 305,717 | Germany | May 11, 1918 |
| 645,366 | Great Britain | Nov. 1, 1950 |